(12) United States Patent
Um et al.

(10) Patent No.: US 10,265,773 B2
(45) Date of Patent: Apr. 23, 2019

(54) METAL FOAM FOR ELECTRODE OF SECONDARY LITHIUM BATTERY, PREPARING METHOD THEREOF, AND SECONDARY LITHIUM BATTERY INCLUDING THE METAL FOAM

(71) Applicant: CellMobility, Inc., Berkeley, CA (US)

(72) Inventors: Ji Hyun Um, Seoul (KR); Hyeji Park, Seoul (KR); Myounggeun Choi, Gyeonggi-do (KR); Hyelim Choi, Seoul (KR); Yong-Hun Cho, Kyunggi-do (KR); Yung-Eun Sung, Kyunggi-do (KR); Heeman Choe, Kyunggi-do (KR)

(73) Assignee: CellMobility, Inc., Berkeley, CA (US)

( * ) Notice: Subject to any disclaimer, the term of this patent is extended or adjusted under 35 U.S.C. 154(b) by 133 days.

(21) Appl. No.: 14/256,838

(22) Filed: Apr. 18, 2014

(65) Prior Publication Data

US 2015/0072236 A1 Mar. 12, 2015

(30) Foreign Application Priority Data

Apr. 19, 2013 (KR) ........................ 10-2013-0043750

(51) Int. Cl.
*H01M 4/525* (2010.01)
*H01M 4/505* (2010.01)
(Continued)

(52) U.S. Cl.
CPC .............. *B22F 3/24* (2013.01); *B22F 3/1121* (2013.01); *B22F 3/222* (2013.01); *C22C 1/0408* (2013.01); *C22C 1/0416* (2013.01); *C22C 1/0425* (2013.01); *C22C 1/0433* (2013.01); *C22C 1/0466* (2013.01); *C22C 33/02* (2013.01); *H01M 4/0404* (2013.01);
(Continued)

(58) Field of Classification Search
CPC .. H01M 4/0404; H01M 4/0471; H01M 5/131; H01M 4/133; H01M 4/366; B22F 3/11; B22F 3/222; B22F 3/24
See application file for complete search history.

(56) References Cited

U.S. PATENT DOCUMENTS

2002/0168569 A1* 11/2002 Barriere ................ H01M 2/164
429/217
2004/0219432 A1* 11/2004 Kojima ............... H01M 4/0438
429/231.95
(Continued)

FOREIGN PATENT DOCUMENTS

JP 2009199744 A * 9/2009 .............. H01M 4/04
KR 1020040096381 A * 11/2004 .............. H01M 4/80

OTHER PUBLICATIONS

Machine Translation of: JP 2009/199744 A, Yao et al., Sep. 3, 2009.*
(Continued)

Primary Examiner — Kenneth J Douyette
(74) Attorney, Agent, or Firm — Aka Chan LLP

(57) ABSTRACT

Using metal foams for the electrode of secondary lithium battery, preparing method thereof, and secondary lithium battery including the metal foam. A metal foam is used in an electrode of secondary lithium battery where the surface and the inner pore walls are coated with the active materials, a method of manufacturing such metal foam, and secondary lithium battery including the metal foam.

19 Claims, 7 Drawing Sheets

(51) Int. Cl.
| | |
|---|---|
| H01M 4/131 | (2010.01) |
| B22F 3/24 | (2006.01) |
| H01M 4/58 | (2010.01) |
| H01M 4/133 | (2010.01) |
| H01M 4/134 | (2010.01) |
| H01M 4/38 | (2006.01) |
| H01M 4/587 | (2010.01) |
| H01M 4/04 | (2006.01) |
| B22F 3/22 | (2006.01) |
| B22F 3/11 | (2006.01) |
| H01M 4/1391 | (2010.01) |
| H01M 4/1393 | (2010.01) |
| H01M 4/1395 | (2010.01) |
| H01M 4/66 | (2006.01) |
| H01M 4/80 | (2006.01) |
| H01M 10/052 | (2010.01) |
| C22C 1/04 | (2006.01) |
| C22C 33/02 | (2006.01) |
| H01M 10/0525 | (2010.01) |

(52) U.S. Cl.
CPC ....... *H01M 4/0445* (2013.01); *H01M 4/0471* (2013.01); *H01M 4/131* (2013.01); *H01M 4/133* (2013.01); *H01M 4/134* (2013.01); *H01M 4/1391* (2013.01); *H01M 4/1393* (2013.01); *H01M 4/1395* (2013.01); *H01M 4/386* (2013.01); *H01M 4/387* (2013.01); *H01M 4/505* (2013.01); *H01M 4/525* (2013.01); *H01M 4/587* (2013.01); *H01M 4/5825* (2013.01); *H01M 4/661* (2013.01); *H01M 4/808* (2013.01); *H01M 10/052* (2013.01); *B22F 2003/247* (2013.01); *B22F 2998/10* (2013.01); *H01M 10/0525* (2013.01)

(56) References Cited

U.S. PATENT DOCUMENTS

| | | | | |
|---|---|---|---|---|
| 2007/0184576 | A1* | 8/2007 | Chang | C23C 18/06 438/104 |
| 2009/0029265 | A1* | 1/2009 | Ota | H01M 10/052 429/322 |
| 2010/0176767 | A1* | 7/2010 | Long | H01M 4/133 320/137 |
| 2011/0176255 | A1* | 7/2011 | Sasaki | H01G 9/016 361/502 |
| 2012/0121976 | A1* | 5/2012 | Koshina | B82Y 30/00 429/207 |

OTHER PUBLICATIONS

Machine Translation of KR 1020040096744 A, Cho et al., Nov. 16, 2004.*

* cited by examiner

METAL FOAM FOR ELECTRODE OF SECONDARY LITHIUM BATTERY, PREPARING METHOD THEREOF, AND SECONDARY LITHIUM BATTERY INCLUDING THE METAL FOAM

CROSS-REFERENCE TO RELATED APPLICATIONS

This patent application claims the benefit of Republic of Korea patent application 2013-0043750, filed Apr. 19, 2013, granted as Korea patent 10-1353262 on Jan. 14, 2014, which are incorporated by reference, along with an English translation of the Korean application, and along with all other references cited in this application.

BACKGROUND OF THE INVENTION

Several different types of secondary batteries are widely used and are commercially applicable as a rechargeable electrochemical energy storage system. Among these secondary batteries, a secondary lithium battery provides advantages in high performance due to the high power capacity and energy density. The use of the secondary lithium battery is important in portable electronic devices such as mobile phones, laptops, digital cameras, and video camcorders. In addition, a secondary lithium battery is a great power source for automotive, hybrid cars, and electric bicycles (e-bikes), which is expected to be used effectively as a promising energy storage system (ESS) in the future. With recent technology trends, there is significant ongoing research and development in an innovative secondary lithium battery to improve the capacity and operating voltage, and in particular, designing a new electrode material.

In particular, an innovative concept of a new electrode material is unavoidable, because a significantly improved performance of secondary lithium battery generally originates from the improvement in the design and physical/chemical characteristics of the cathode and anode. On the other hand, the conventional cathode and anode have been fabricated by the following steps. First, slurry is prepared by mixing an active material, a conductive material, and a binder. The slurry is then applied on a metallic current collector in the form of a thin film, which is subsequently dried and pressed at room temperature, finally producing the cathode and anode electrodes. In this case, the current collector plays a vital role as an electrode support along with an electron acceptor and donor. It is therefore highly desirable to enlarge the contact area and minimize the contact resistance between the metallic current collector and active material in order to improve electrode performance by accepting or donating electrons as efficiently as possible.

In this respect, the conventional electrode mentioned above may not have sufficiently good adhesion to bond a coating layer to the current collector film, which can cause a problem of increasing the contact resistance due to exfoliation of the coated material from the current collector. Moreover, during the actual charging and discharging cyclic operations, the powder materials degrade and fall off due to stresses caused by volume expansion. Additionally, the binder is electrically non-conductive and generally degrades the conductivity of the electrode. The present invention relates solutions to overcome the limitations as stated above. An aspect of the invention is to use porous metal foam as an electrode, which can accommodate stresses and strains developed during charging/discharging cycling.

Therefore there is a need for a secondary lithium battery with metal foam electrode.

BRIEF SUMMARY OF THE INVENTION

The present invention is directed towards use of metal foams for the electrode of secondary lithium battery, preparing method thereof, and secondary lithium battery including the metal foam. In this particular embodiment, the developed technique relates to metal foam for use in the electrode of secondary lithium battery wherein the surface and the inner pore walls are coated with the active materials, a method of manufacturing such metal foam, and secondary lithium battery including the metal foam.

The present invention relates solutions to overcome the limitations as stated above. The purpose of the invention is to provide metal foam structure for the electrode of lithium batteries, which exhibits superior cycling characteristics and significantly improved charge and discharge efficiency, a method of preparing such metal foam structured electrode and a lithium battery including the metal foam. The useful characteristics of the metal foam originate from the coated active material in direct contact with metal foam to minimize contact resistance and maximize contact area. The loss of active material can also be minimized during multiple cycles of operation because of the metal foam's ability to properly accommodate the stresses due to the volume expansion. Among many other processing methods of open-cell metal foams, metal-plating technique (on porous polymer-template) and ice-templating (or freeze-casting) technique appear to be promising, because they provides cheap, easy processing route, which also has excellent capability of mass production. Furthermore, the ice-templating technique provides well-aligned and long channel pores, expected to help improve liquid electrolyte flow during the operation of the battery.

The present invention is directed towards metal foam for use as an electrode of a secondary lithium battery, manufacturing methods of open-porous metal foam, preparing method thereof, and a secondary lithium battery including the metal foam. In this particular embodiment, the developed technique relates to metal foam for an electrode of a secondary lithium battery wherein the metal foam is fabricated using electroless plating or freeze casting, and its surface and inner pore walls are coated with an active material, including a method of manufacturing such metal foam and a secondary lithium battery including the metal foam. The present invention provides metal foam for an electrode of a secondary lithium battery that includes a regularly-spaced porous metal structure capable of being coated with an active material in direct contact with the surface and inner pore wall of the metal foam, without help of binders and conductive materials. The present invention is characterized such that the metal foam has significantly higher specific surface area compared to the conventional metal foil used as a current collector. Therefore, the porous structure of the metal foam minimizes the contact resistance, maximizes the contact area between the active material and current collector, and accommodates the stresses and strains developed during the volume expansion of active material in charging of Li ions, which thus leads to higher capacity, excellent cycling characteristics, and exceptionally improved charge/discharge efficiency.

Solution to Problems

The present invention is intended to achieve the following: To provide metal foam for use as an electrode of a secondary lithium battery wherein some or all of the surface and the inner pore wall are coated by the active material. Any processing method of producing porous metal foam with pore size ranging from several hundred microns to several nanometers would be acceptable; on the other hand, metal-plating and ice-templating techniques appear to be very attractive because they possess excellent capability of mass production.

The present invention proposes a preparing method of metal foam for use as an electrode of a secondary lithium battery wherein some or all of the surface and the inner pore wall are coated by the active material. One embodiment of the method includes a coating process of the metal foam with the active material.

The present invention suggests a secondary lithium battery including the metal foam as an electrode. Herein, the metal foam has regularly-spaced open pores and is fabricated by any processing method of producing open-porous metal foam.

Influence of Invention

The present invention provides metal foam for use as an electrode of a secondary lithium battery that includes a porous structure capable of having a high density of the active coating materials in direct contact with the surface and the inner pore wall of the metal foam, without the presence of binder and conductive materials. The metal foam has significantly higher specific surface area compared to the metal foil that has been conventionally used as a current collector. Therefore, the unique porous structure of the metal foam as the current collector minimizes the contact resistance and maximizes the contact area with the active material, and thus leads to excellent cycling characteristics and exceptionally improved charge/discharge efficiency.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3A shows the surface of the copper foam prior to immersion in a gel solution. FIG. 3B shows the surface of the copper foam manufactured in example 1. FIG. 3C shows the surface of the copper foam manufactured in example 2. FIG. 3D shows the surface of the copper foam manufactured in example 3.

DETAILED DESCRIPTION OF THE INVENTION

Figure 1:
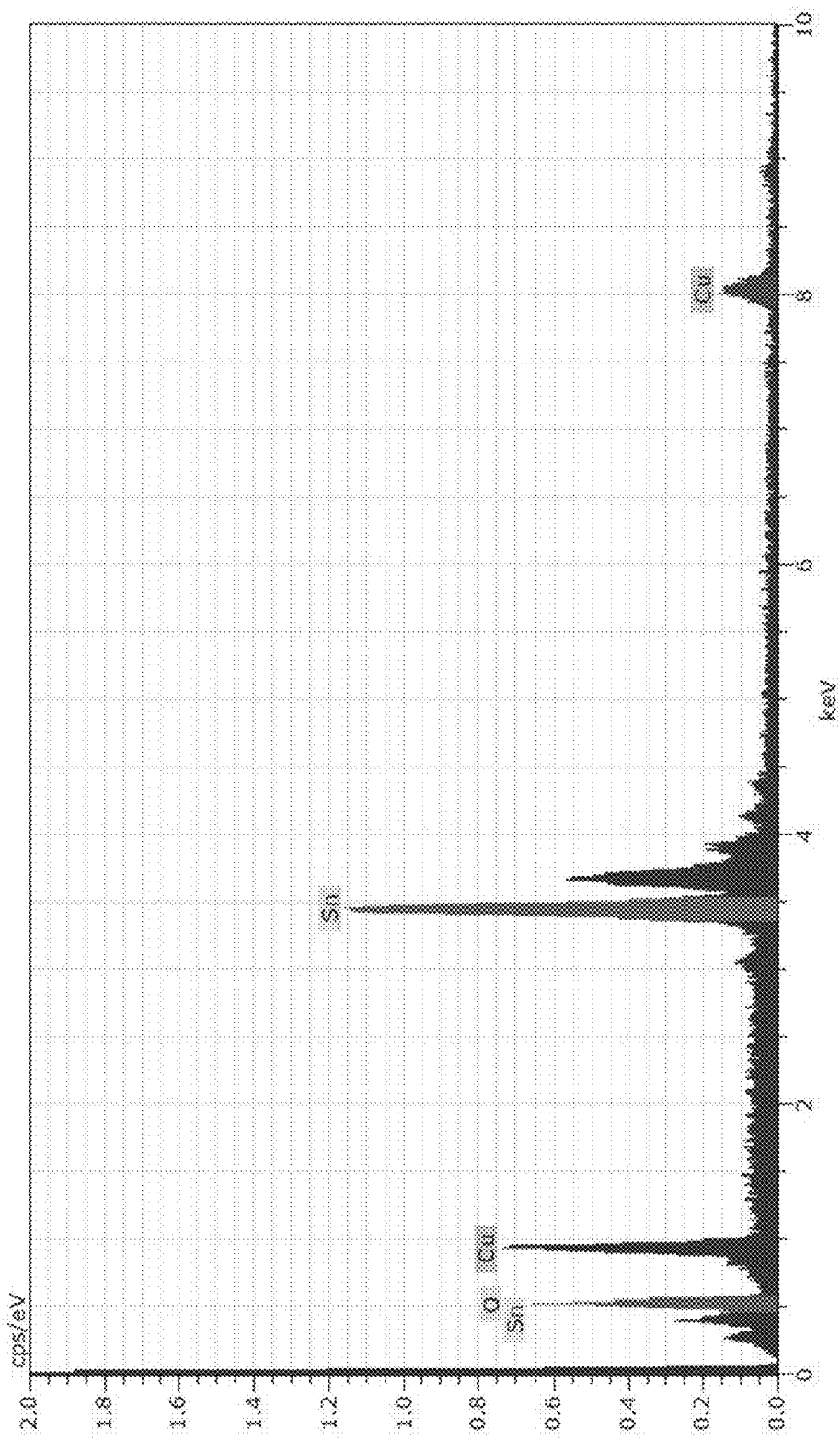
FIG. 1 shows an Energy Dispersive X-ray (EDX) spectrum illustrating copper foam manufactured in example 1.

Hereinafter, embodiments of the present invention will be described in more detail.

According to the present invention, the metal foam for use as electrode of a secondary lithium battery is characterized such that some or all of the surface and the inner pore wall are coated by the active material.

The present invention includes the active material capable of intercalating and deintercalating lithium ions, or storing and separating lithium ions through alloying or conversion reaction. The active material may be a cathode or an anode active material. The cathode active material should be a compound capable of reversibly intercalating or deintercalating lithium. The cathode active material is not particularly limited as long as it can be used for a cathode of a secondary lithium battery. For example, cathode active materials can be NCM-based materials such as LCO ($LiCoO_2$), LMO ($LiMn_2O_4$), LMO ($LiMn_{24}LiFeO_4$), LFP ($LiFePO_4$), and $LiNi_{1/3}Co_{1/3}Mn_{1/3}O_2$. Additionally, the anode active material includes a material capable of reversibly intercalating or deintercalating lithium; and it should be an anode active material known in the art which is used for an anode of a secondary lithium battery. The anode active material is not particularly restricted and it can be selected from a group of the following materials: low-crystalline carbon-based materials including artificial graphite, natural graphite, soft carbon, hard carbon, and metal alloys including Si—Li based alloys, In—Li based alloys, Sb—Li based alloys, Ge—Li based alloys, Bi—Li based alloys, Ga—Li based alloys, and oxide based materials including $SnO_2$, $Co_3O_4$, CuO, NiO, and $Fe_3O_4$.

The present invention provides a metal foam which is coated with either a cathode active material or an anode active material. When the metal foam structure serves as a current collector, it is possible to supply electrons as a reacting means or transport electrons to external circuit by accumulating electrons generated by electrochemical reactions. The material that can be used for manufacturing the metal foam includes but not limited to: aluminum, nickel, copper, gold, stainless steel (SUS), or their alloys. It is desired to fabricate the anode current collector with the copper foam and the cathode current collector with the aluminum foam, mainly because of their high electrical conductivity and appropriate electrochemical potential.

The manufacturing process of the porous metal foam is not restricted to a single method but can be achieved via another metal-foam processing method, such as powder sintering, space holder methods, ice-templating, dealloying, electroplating, electroless plating, or chemical vapor deposition (CVD).

Some techniques to synthesize open cell structural foams include powder sintering, electroplating, or electroless plating, or combinations of these. Powder sintering is a relatively easy and readily available technique to synthesize open cell structural foams. One can use this technology to create open-cell structural metal foams after compressing the powder at room temperature to form a green body and sintering this at high temperature.

For electroplating and electroless plating, metal ions in a solution are plated onto a premade polymeric template. The premade polymeric template is later removed by heat or chemical treatments. In a specific technique, electroless plating deposits a thin layer of nickel or copper onto any material. The material is immersed in a liquid bath containing nickel or copper ions to be deposited. The copper foams manufactured in examples 1, 2, and 3 provided in the present invention were fabricated by electroless plating.

An additional step when using electroless plating is to include a pretreatment step for plating metal onto the surface of a polymeric foam template in order to provide a catalytic reduction sites for the metal ions. This pretreatment process usually involves immersing the polymer template into solutions containing tin and palladium ions. After this, the foam structure is immersed in metal ionic solution such as nickel and copper. A pure metallic foam is finally fabricated after eliminating the polymer template by chemical or heat treatment. On the other hand, the removal process of the polymer template can be skipped or omitted if the metallic foam is to be used as an electrode and catalytic reaction takes place only on the surface of the polymer template. In the present invention, the polymer template inside the copper foams examples 1, 2, and 3 were removed by a thermal process.

Electroplating is a similar process to electroless plating except that it uses electricity for the surface coating of the template material using the principle of electrolysis. The polymer template surface is provided with conductivity through a pretreatment step. In addition, a metal foam is synthesized out of the polymeric template foam using the same or similar plating process as that used in electroless plating, with supply of electric current. The advantage of electroplating is that it has a faster plating rate and a high purity in the coating layer. However, the thickness of the plating layer is unlikely to be as uniform as that from using the electroless plating technique.

Another technique is a space holder method. This technique includes mixing the space holder and metal powder together, removing the space holder, and leaving behind the pore spaces. For example, after a heat treatment or chemical treatment on the mixture of salt powder and metal powder, the salt powder just acts as a space holder and can be rinsed and removed by water. In addition, polymer particles or low melting-point metals such as tin, magnesium, or zinc can also be used as a space holder, since they can be molten away.

Another technique is an ice-templating method. This technique includes the following steps. First, make a slurry by mixing ceramic, metal, or polymer powder with water and binder. Then, immerse the copper rod into liquid nitrogen and control the temperature at the copper rod. And then pour the slurry on it. Once the metal powders are frozen between the ice dendrites, one can dry the ice below the freezing point using a freeze dryer. Then, the porous green body structure will be formed in the space formerly occupied by the ice dendrites. Using liquid nitrogen in the cooling step with the metal rod leads to a faster cooling rate, which results in relatively very small pores, on the order of tens of microns in diameter for titanium metal foam. Some parameters that can affect the results of this process include the metal powder size, binder type, heat treatment temperature. A three-dimensionally constructed porous metal foam will be formed once the porous green body is sintered at a high temperature. An advantage of using ice-templating is that a directional porous structure can be obtained, because the ordered directional channels help provide an active contact between the electrolyte and active material during charging and discharging. The copper foams manufactured in coin-cell examples of 1, 2, and 3 in the present invention were fabricated by ice-templating.

Another technique is a dealloying method. Dealloying can be used to create metal foams with nanosized or sub-micron pores. A metal alloy will be formed with two or more metallic elements. Generally, the two or more metallic elements in the alloy have sufficient differences in electrochemical potentials in which one metal element is less noble and selectively etched away using a particular etching solution, and then the more noble metal element remains nanoporous. In this case, it is particularly emphasized that the selective etching is only possible when there is a sufficient electrochemical potential difference between the two elements.

The copper electrode (plus current collector), which is manufactured by a method or a combination of more than one method from the above processes, can be applied to either the cathode or anode, or to both.

Another aspect of the present invention relates to the ice-templating method.

As an example of making such a secondary lithium battery with metal foam as electrode, the following ice-templating process can be used:

(a) Immerse a copper rod (or other metal with a sufficient high thermal conductivity) into liquid nitrogen and pour the metal slurry that is mixed with water (a freezing medium) and binder. Other freezing mediums can also be used instead of liquid nitrogen to decrease the freezing rate and control the final pore size in the metal foam product.

Copper has one of the highest thermal conductivities among metals, and this result in having a very high thermal gradient in the slurry resulting in a distribution of relatively small pores. Other metals can be used too. However, with other metals having lower thermal conductivity will result in different microstructure. For example, an iron rod can be used to have less thermal gradient in the slurry, which will result in larger pores than when using copper.

(b) Freeze the metal particles, where the metal particles are interposed between the directionally grown ice dendrites.

(c) Form the porous structure by drying the ice of the slurry below the freezing point, leaving pores in their place and forming well-aligned porous channels.

(d) Form the final porous metal foam product by sintering the porous green-body structure in a vacuum furnace.

(e) Cut the porous metal foam into thin layers, and apply it as an electrode in a secondary lithium battery.

Regarding methods used for coating the surfaces and the inner pore walls with the active materials, it is possible to use different methods or the same method for coating process of the metal foam. When coating the surface and the inner pore wall by respective methods, the surface coating can be performed by various methods, such as physical vapor deposition (PVD), chemical vapor deposition (CVD), thermal spraying, and other known methods. The coating process of the inner pore wall can be achieved via ion-plating, sol-gel process, co-precipitation, and impregnation by permeating gas or solution into the pores. It may be desired to use ion-plating, sol-gel process, co-precipitation, or impregnation when plating the surfaces and the inner pore walls by the same method.

According to the present invention, a method of manufacturing metal foam for use as electrode of a secondary lithium battery is now described wherein some or all of the surface and the inner pore wall are coated by the active material.

The present invention provides a method of preparing metal foam for use as an electrode of a secondary lithium battery wherein some or all of the surface and the inner pore wall are coated by the active material, and the method includes a process of coating the metal foam with the active material.

In this case, it is possible to form a coating layer on the surface or the inner pore wall of the metal foam by using any method known in the art, and this coating process can be achieved either by a combination of different methods or the same method.

Specifically, when coating the surface and the inner pore wall of the metal foam by using a combination of different coating methods, the surface coating can be achieved by various methods such as PVD, CVD, thermal spraying, and other known methods. Coating of the inner pore wall may preferably be carried out by permeating gas or solution into the pores. A method using precursor solution includes ion-plating, sol-gel process, co-precipitation, and impregnation. If the particles of the active material are diffused in the colloidal solution, the solution is permeated into the metal foam and is then dried and calcinated to form a coating layer.

Furthermore, when using the same method for coating the surface and the inner pore wall for the metal foam, such coating process can be achieved by various methods, for example, including ion-plating, sol-gel process, co-precipitation, and impregnation.

Especially, the sol-gel process is a preferable method for coating the surface and the inner pore wall of the metal foam. The advantages of the sol-gel process include low synthetic temperature and faster heat treatment time. In addition, this method also provides the high crystallinity of the synthesized material as well as the uniform distribution of the nano-sized particle during the operation.

The present invention describes a sol-gel process to form a coating layer consisting of the active materials formed on the surface and the inner pore wall of the metal foam as the following:

(a) Preparing a sol solution that contains precursor compound.

(b) Permeating the sol solution into the surface and inside of the metal foam.

(c) Drying the metal foam.

(d) Heat-treating the metal foam.

Step (a) is the process of preparing a solution containing the compound that would be the precursor for the active material to form a coating layer. Step (a), according to a method commonly known in the art, consists of the following steps. First, immerse the precursor compound into the solvent and add acids such as hydrochloric acid as a catalyst. And then stir the solution. After hydrolysis and condensation reactions take place, sol solution will be formed into gel at least partly. More hydrolysis and condensation reactions will occur as necessary to form a complete gel solution and aging may be followed for a certain amount of time.

The most commonly used precursor compounds include metal organic compounds including metal alkoxide, metal acetyl acetate, and metal organic acid salts, and metal inorganic compounds including nitrate and chloride, which forms a sol solution in the sol-gel process. The precursor compounds, such as $SnCl_4$, $Sn(CH_3COO)_2$, $Sn(NO_3)_2$, $SnCO_3$, $Sn(CH_3)_4$, $(CH_3)_2SnCl_2$, $Sn(C_4H_9)_2(CHCOO)_2$, and $Sn(XR)_2$ [Here, X—O, S, or N; R-Me, Et, i-Pr, or t-Bu] can be contained in the solution to form a coating layer formed of tin or tin oxide.

One or more of the following solutions may be added as a binder as necessary: polymethylmethacrylate (PMMA), polyacrylonitrile (PAN), polyvinylpyrrolidone (PVP), polyvinylalcohol (PVA), polyethylene oxide (PEO), polyvinylacetate, cellulose acetate, cyanoethylpolyvinylalcohol, pullulan, and carboxylmethyl cellulose.

The step (b) is comprised of applying the solution prepared in step (a) on the surface of the metal foam and then permeating the solution inside the metal foam. This step can be performed by immersing the metal foam into the solution (in the sol state prior to gel) or spraying the solution to the metal foam. When immersing the metal foam into the solution, it is desirable to use the method of pressure impregnation to facilitate wetting inside the metal foam.

Step (c) is the stage of drying the metal foam, which includes but is not limited to: spray drying, tray drying, freeze drying, solvent drying, and flash drying. Some or all of the surface and inner pore wall of the metal foam becomes coated with the active material after the solution applied on the metal foam is dried by carrying out step (c).

Step (d) includes a process of heat-treating the metal foam coated with the active material, which results in crystallization of the coating layer in amorphous state formed on the surface and inner pore wall of the metal foam from step (c).

Step (d) should be carried out under inert, vacuum gas or reducing gas atmosphere to prevent the oxidation of the metal foam. If this step is performed in a reducing gas atmosphere and the coating layer of active material formed in step (c) is metallic oxides, the coating layer of active material can then transform into the pure metal from the reduction of the metal oxide through this step. For example, when the metal oxide coating layer is $SnO_2$, the coating layer of active material will then be pure tin which has a higher capacity than tin oxide by the heat-treatment of step (d) in a reducing atmosphere. On the other hand, this pure tin coating can be directly obtained using a commonly known method of electroless plating process. Furthermore, nanoscale $SnO_2$ needles can also be grown on the pure tin surface of the metal foam by an anodizing process to enhance the specific surface area to react with lithium ion and improve the capacity.

Considering the types of the active material that constitutes the coating layer, those skilled in the art at this step can properly select the annealing temperature and time within the range that crystallization of active material occurs.

Hereinafter, the present invention describes secondary lithium battery including the metal foam for use as electrode wherein some or all of the surface and inner pore wall of the metal foam becomes coated with the active materials mentioned above.

The present invention relates secondary lithium batteries consisting of a cathode, an anode, a separator membrane, and an electrolyte. The cathode and anode electrodes are characterized such that they consist of metal foam electrode plus current collector of the battery system where some or all of the surface and inner pore wall is coated with the active materials.

On the other hand, the present invention relates to a secondary lithium battery that includes a cathode, an anode, an electrolyte, and a separator membrane, and each such element that is not made of the metal foam of the present invention can be manufactured by the conventional composition known in the art, without any particular restriction. For example, the cathode and anode active materials, the conductive materials, or the binders of the present invention can be coated on the metallic current collector with the foil shape to fabricate the cathode and the anode. Polymers used in a separator membrane are polyolefin-based porous films including polyethylene and polypropylene. The organic solvent is selected from a group consisting of the following: propylene carbonate (PC), ethylene carbonate (EC), dimethyl carbonate (DMC), ethyl methyl carbonate (EMC), butylene carbonate, benzonitrile, acetonitrile, tetrahydrofuran, 2-methyl tetrahydrofuran, dioxolan, 4-methyl dioxolan, N-dimethyl formamide, dimethyl amide acetonitrile, dimethyl sulfoxide, dioxane, 1,2-dimethoxyethane, sulfolane, dichloroethane, chlorobenzene, nitrobenzene, diethyl carbonate, methyl propyl carbonate, methyl isopropyl carbonate, ethyl, butyl carbonate, dipropyl carbonate, diisopropyl carbonate, dibutyl carbonate, diethylene glycol, dimethyl ether. Examples of lithium salts are $LiPF_6$, $LiCF_3SO_3$, $Li(CF_3SO_2)_2$, $LiBF_4$, $LiClO_4$, $LiN(SO_2C_2F_5)_2$. The solid polymer electrolyte is composed of a lithium salt dissolved in one or a combination of more than two solvents described above. The solid electrolyte consists of the polymers such as polyethylene oxide, polypropylene oxide, polyethyleneimine, which has relatively high ion conductivity to lithium ion, and it is impregnated with electrolytic solution to provide the electrolyte in the form of gel.

Secondary lithium batteries can have various shapes such as a cylinder, a square, a coin, and a pouch depending on the application of the present invention.

Hereinafter, embodiments of the present invention will be described in more details. While examples of the illustrated embodiments are described in detail, those descriptions and embodiments are not intended to limit the scope of the claimed invention.

Embodiment 1

Approximately 0.03 milliliters of 37 percent (weight/weight) HCl is blended with 0.47 milliliters of EtOH to prepare a mixture of the solvent, and 0.338 grams of $SnCl_2.2H_2O$, which is used as a precursor, is dissolved in the mixture to form a precursor solution (3 molar). After aging the precursor solution for 24 hours, 0.03 milliliters of deionized water is then added to the solution and the transparent gel solution is obtained by subsequent aging for 24 hours, in which hydrolysis and condensation polymerization take place. The disk-shaped copper foam (copper foam fabricated by electroless plating) with a diameter of 11 millimeters is immersed in the gel solution and then it is aged for 24 hours again. The copper foam is then taken out from the gel solution and is maintained in the vacuum oven for 24 hours at the temperature of 80 degrees Celsius in order to eliminate the solvent left in the inside and outside of the copper foam. The copper foam for a secondary lithium battery is then finally fabricated after coating the surface and inner pore wall with tin oxide by heat-treating the dried copper foam (Cu foam) in the argon gas atmosphere at the temperature of 500 degrees Celsius.

Figure 2:
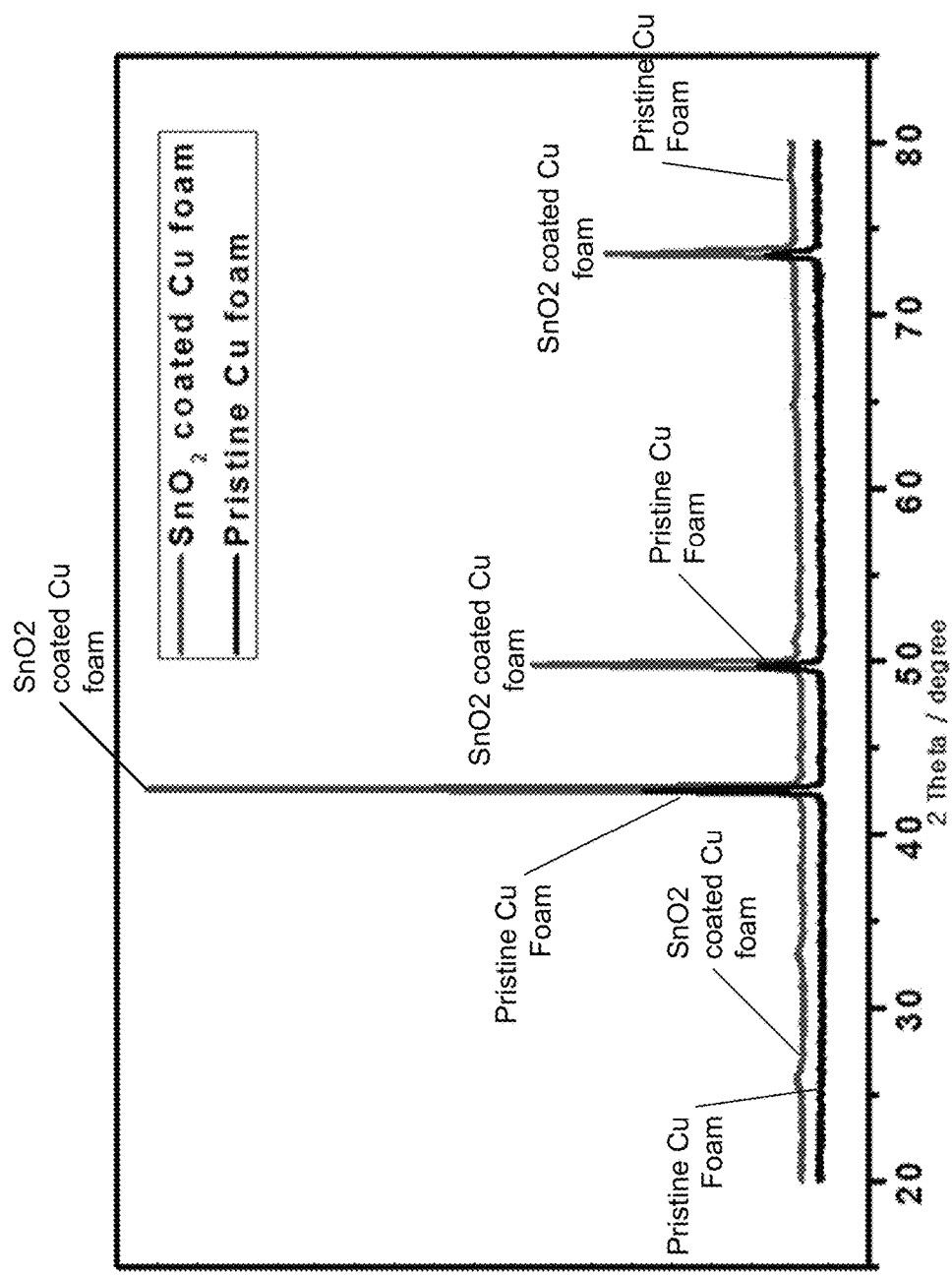
FIG. 2 shows an X-ray Diffraction (XRD) spectrum for the copper foam manufactured in example 1 and the pristine copper foam prior to immersion in a gel solution.
Figure 3A:
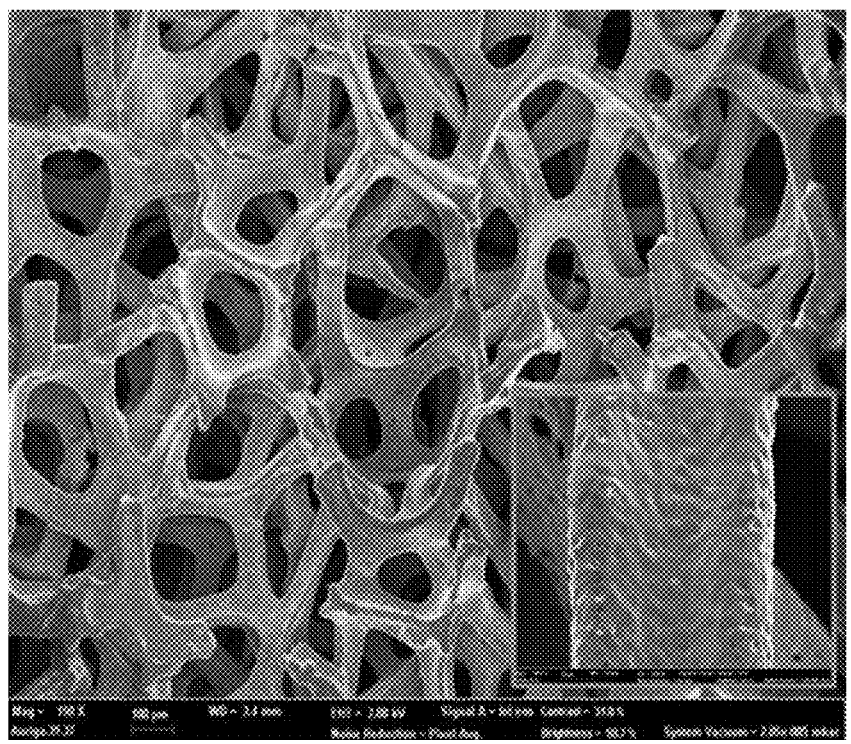
FIGS. 3A-3D show micrographs of Scanning Electron Microscopy (SEM) to illustrate the following.
Figure 3B:
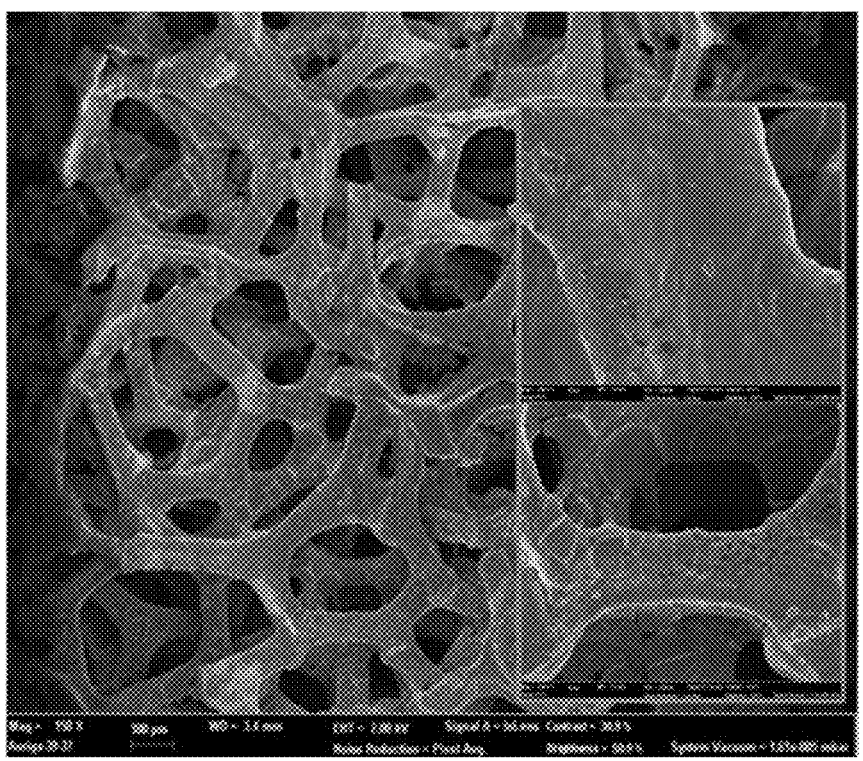

FIG. 1 shows an Energy Dispersive X-ray (EDX) spectrum illustrating copper foam which is manufactured in this example, and FIG. 2 shows a result of XRD illustrating the copper foam manufactured in the example and pristine copper foam before immersion into gel solution. FIGS. 1 and 2 confirm the presence of Cu, Sn, and O inside the copper foam that is manufactured in this example, and JCPDS analysis also confirms that crystallized tin oxide ($SnO_2$) is formed on the pore wall of the copper foam. FIGS. 3A and 3B represent SEM micrographs of the copper foam prior to immersion in gel solution and copper foam manufactured in this example, respectively. The copper foam in this example was manufactured by electroless plating and shows smooth surfaces of the pore walls before coating process, whereas the copper foam manufactured in this example shows rough surfaces of the pore wall after the coating process. In other words, this example indicates that the inner pore wall of the copper foam is coated by tin oxide.

Embodiment 2

The precursor solution (5 molar) is prepared by dissolving 0.563 grams of $SnCl_2.2H_2O$, which is a precursor to form a $SnO_2$ coating layer in the later stage. The copper foam for use in a secondary lithium battery is subsequently fabricated after coating the surface and the inner pore wall with tin oxide by the same method as in the example 1, except that the gel solution precipitating the precursor is sonicated for 1 hour before immersing the copper foam in the gel solution.

Figure 3C:
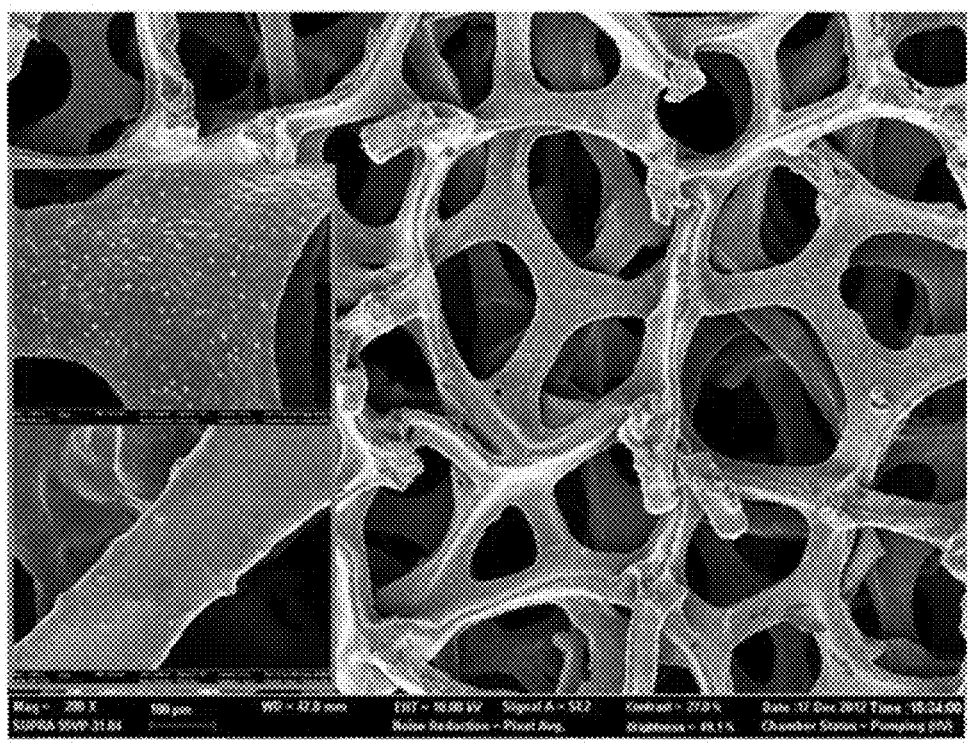

FIG. 3C shows a SEM micrograph of the surface of the copper foam manufactured in this example. In the embodiment of the present invention, the pore wall of the copper foam is coated with tin oxide over a wide range by using a precursor solution that is more concentrated than that of example 1, which makes relatively bright areas more noticeable.

Embodiment 3

Another copper foam for use in a secondary lithium battery having the surface and inner pore wall coated with tin oxide is fabricated by the same method as in the case of example 1, except that the precursor solution (10 molar) is produced in this case by dissolving 1.127 grams of $SnCl_2.2H_2O$ to form a $SnO_2$ coating layer.

Figure 3D:
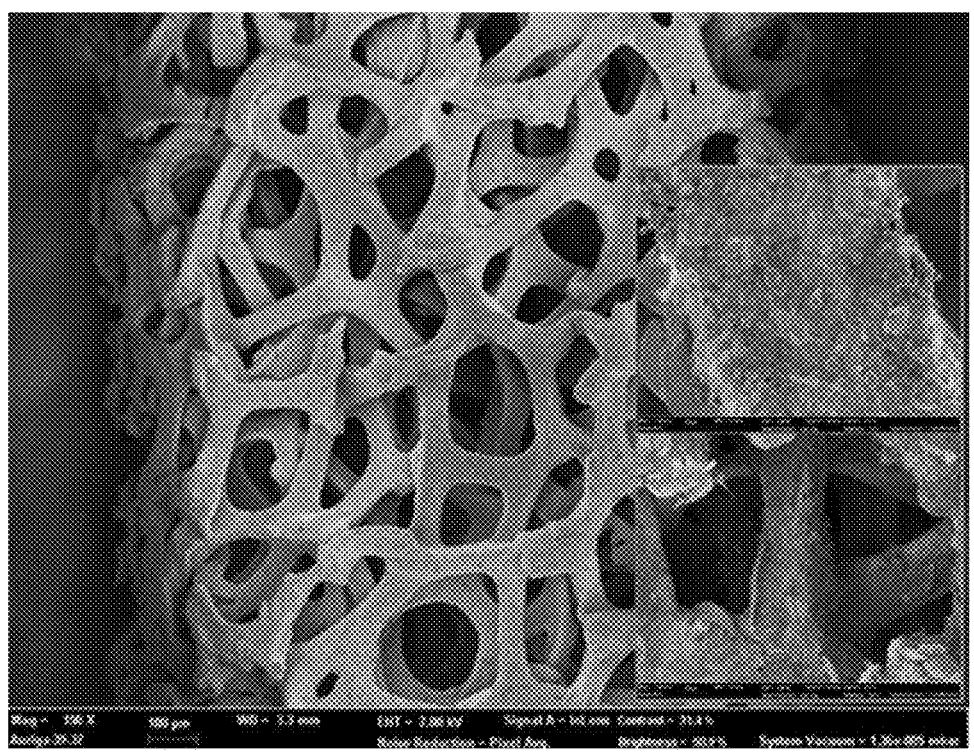

FIG. 3D shows a SEM micrograph of the surface of the copper foam manufactured in this example. The pore walls of the copper foam are coated by tin oxide over a wider range, which makes relatively brighter areas more noticeable, since the precursor solution used in this example has higher concentration than those used in examples 1 and 2. Also, the surface area is increased more because the surface of the pore wall is formed more roughly due to the higher concentration of tin oxide coating.

Embodiment 4

The coin cell is fabricated by using the copper foam manufactured in example 1 as a working electrode, lithium foil as a counter electrode, polypropylene film as a separator membrane, and $LiPF_6$ solution (1 molar), which is formed by dissolving $LiPF_6$ in a mixed solvent of ethylene carbonate and diethyl carbonate (1:1 (volume/volume)) as an electrolyte.

Embodiment 5

Another coin cell is manufactured by the same method used in the example 4, except that the different amount of coating material (5 molar) was used for this copper foam as in example 2.

Embodiment 6

Another coin cell is manufactured by the same method used in the example 4, except that the different amount of coating material (10 molar) was used for this copper foam as in example 3.

Embodiment 7

In the example 7, the coin cell is fabricated by using copper foam manufactured by freeze casting. This copper foam has smaller pore size than that produced by electroless plating, with pore sizes ranging from several tens to hundred tens microns. Depending on the freezing rate, the pore can have elongated shape. The copper foam was applied as a working electrode, lithium foil as a counter electrode, polypropylene film as a separator membrane, and $LiPF_6$ solution (1 molar), which is formed by dissolving $LiPF_6$ in a mixed solvent of ethylene carbonate and diethyl carbonate (1:1 (volume/volume)) as an electrolyte. In this example, the amount of coating material used was 3 molar as in example 1.

Embodiment 8

Another coin cell is manufactured using the same type of copper foam manufactured by the same method used in the example 7, except that the different amount of coating material (5 molar) was used in this example 8 as was used in example 2.

Embodiment 9

Another coin cell is manufactured using the same type of copper foam manufactured by the same method used in the example 7, except that the different amount of coating material (10 molar) was used in this example 9 as was used in example 3.

Comparative Example

A precursor solution (3 molar) was fabricated by first dissolving 0.338 grams of $SnCl_2.2H_2O$ in a solvent comprising 0.03 milliliters of 37 weight percent HCl and 0.47 milliliters of EtOH to form a tin oxide coating layer. The mixture was aged for 24 hours, which was aged for 24 hours again after 0.03 milliliters of DI water was added. A transparent gel solution was obtained by hydrolysis and condensation. The gel solution was aged 24 hours after a disk-shaped copperfoil with a diameter of 11 millimeters was immersed in the gel solution. Then, the copper foil was taken out of the gel solution and was maintained in vacuum oven for 24 hours at the temperature of 80 degrees Celsius in order to eliminate the solvent left inside and outside of the copper foil. Once the copper foil was dried, it was finally heat-treated at 500 degrees Celsius in Ar gas atmosphere; then, the copper foil that was confirmed to have tin oxide coating on the surface. The coin cell was prepared with the copper foil as a working electrode, lithium foil as a counter electrode, polypropylene film as a separator membrane, and $LiPF_6$ solution (1 molar) formed by dissolving $LiPF_6$ in a mixed solvent of ethylene carbonate and diethyl carbonate (1:1 (volume/volume)) as an electrolyte.

Experimental Example

The cyclic charge and discharge experiment of a secondary battery containing the copper foam as an electrode manufactured in examples 4-6.

The coin cells manufactured in example 4 and comparative example were observed and compared for the charge-discharge characteristics. Specifically, the assembled battery was charged and discharged from 0.0 to 2.0 voltages at a rate of 1 C (1 times capacity of the battery), which equals to a theoretical capacity value of tin oxide at 781 milliampere-hour/grams with a capacity of 1 C. A plot of specific capacity as a function of cycle numbers is represented in FIG. 4.

Figure 4:
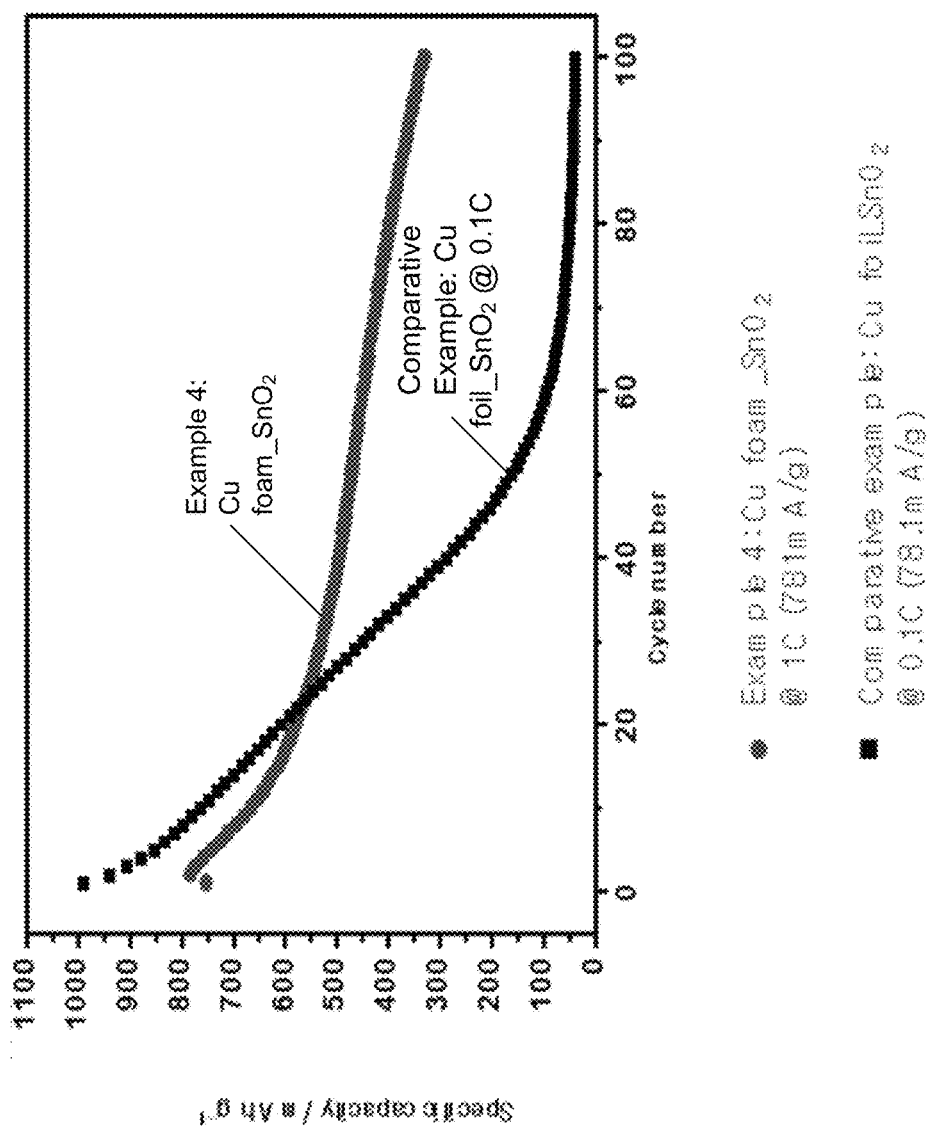
FIG. 4 shows plots of specific capacity as a function of cycle numbers at the charge and discharge rate of 1 C for the coin cell manufactured in example 4 and comparative example.

From FIG. 4, the coin cell manufactured in comparative example has slightly higher specific capacity until tenth cycle compared with that manufactured in example 4. The specific capacity is rapidly deteriorating as the number of cycle increases. On the other hand, the working electrode of the battery manufactured in example 4 provides excellent cycling characteristics since its reduction rate of specific capacity is less than 50 percent compared to the initial specific capacity at cycle 100.

In addition, the charge/discharge characteristics are observed and compared under different conditions of the charge/discharge rate for the coin cells manufactured in examples 4, 5, and 6, and in comparative example, respectively. For the coin cells manufactured in examples 4, 5, and 6, the charge and discharge cyclic experiment is carried out from 0.0 to 2.0 voltages at a rate of 1 C, which is based on a theoretical capacity of tin oxide at 781 milliamp-hours/grams. On the other hand, the coin cell manufactured in comparative example is charged and discharged at a rate of 0.1 C and FIG. 5 represents its result of specific capacity as a function of cycle numbers.

Figure 5:
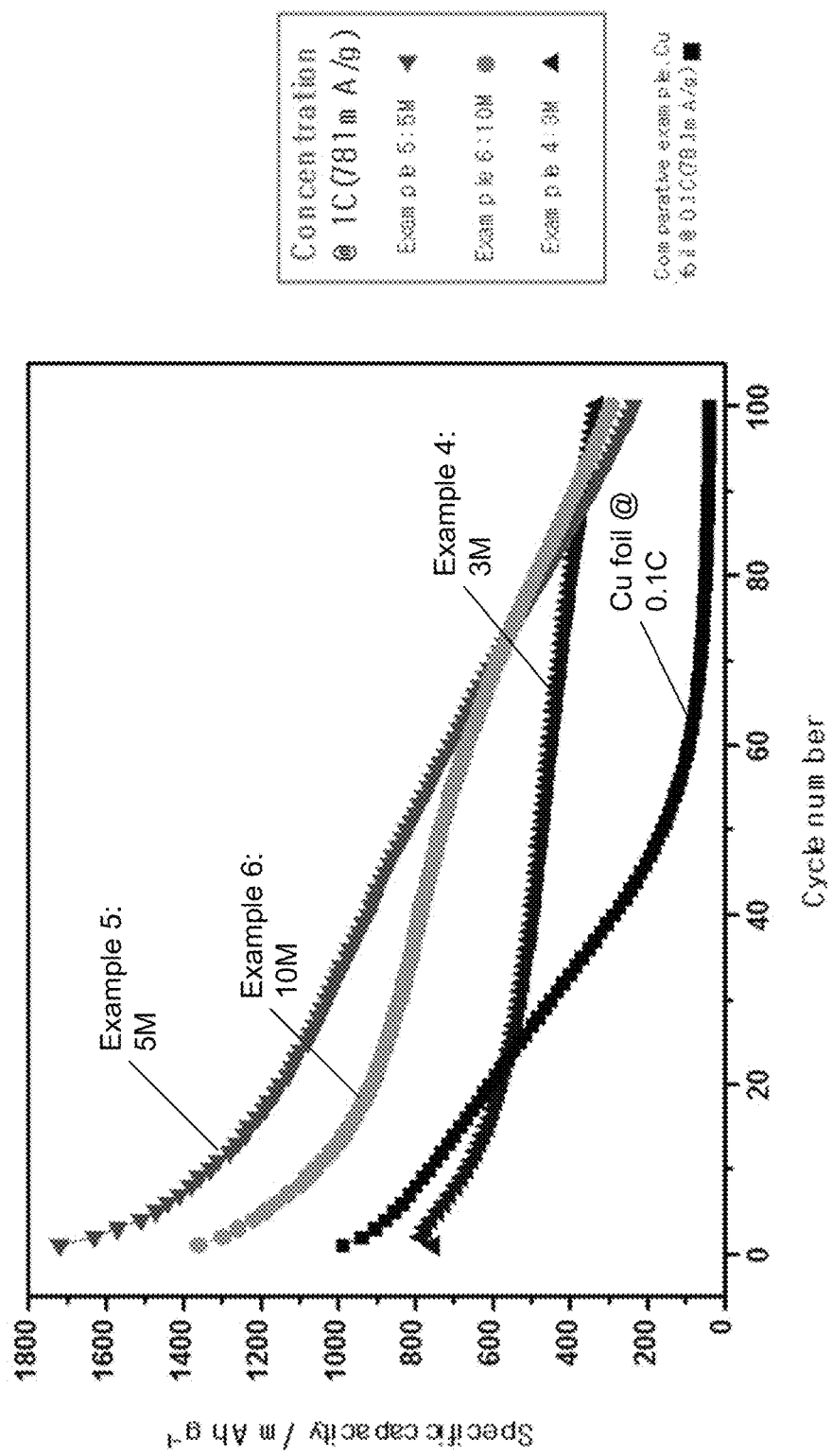
FIG. 5 shows plots of specific capacity as a function of cycle numbers at the charge and discharge rate of 1 C for the coin cell manufactured in examples 4, 5, 6 and at the charge and discharge rate of 0.1 C for that manufactured in comparative example.

In FIG. 5, the coin-cell batteries manufactured in examples 4, 5, and 6, despite being charged and discharged at a relatively higher rate compared to that manufactured in comparative example, show far more stable cycling characteristics than that in the comparative example. It clearly shows that those batteries with copper foam as working electrode has performance advantages and superior characteristics to that with conventional copper foil.

Figure 6:
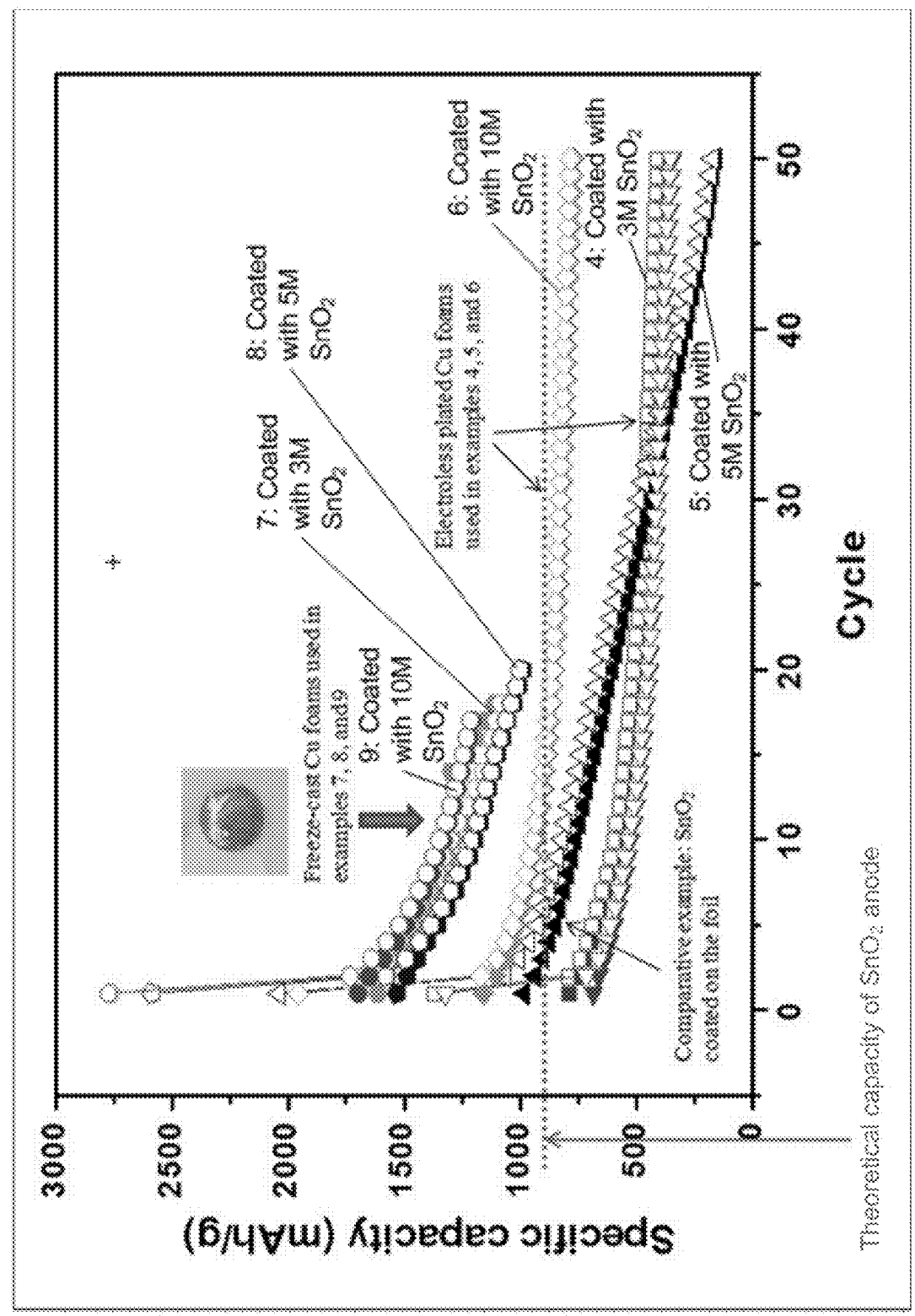
FIG. 6 shows plots of specific capacity as a function of cycle numbers at the charge and discharge rate of 1 C for the coin cell manufactured in examples 4, 5, 6, 7, 8, 9 and at the charge and discharge rate of 0.1 C that manufactured in comparative example.

Furthermore, in FIG. 6, the coin-cell batteries manufactured in examples 7, 8, and 9 show even more stable cycling characteristics than those in examples 4, 5, and 6, and that in the comparative example. It clearly shows that those batteries with freeze-cast copper foam as working electrode has superior characteristics to that with conventional copper foil. The even more improved performance with the lithium coin cell using freeze-cast copper foam as a working electrode is probably due to its smaller pore size and thus greater specific area.

As described above, the copper foams electrode plus current collector manufactured in the present invention show superior cycling characteristics compared with that manufactured in a comparative example. The repeated charge and discharge cycling can lead to the repeated volume expansion and contraction of the active material, resulting in high stresses and strains in the electrode. In this case, the contact area between the active material and the current collector will gradually be reduced due to the volume change and corresponding stresses of the active material. If the metal foam, on the other hand, is used as an electrode plus current collector, the interfacial resistance between the foam and active material will be minimized owing to the inherent nature of the foam's ability to accommodate stresses and strains by utilizing the regularly-spaced porous structure.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of fabricating a metal-foam current collector electrode for a secondary lithium battery, comprising a process of coating an active nonmetallic material onto the metal-foam current collector electrode comprising a porous copper foam, wherein at least a portion of a surface and inner pore wall are coated with the active nonmetallic material, and
after the process of coating an active nonmetallic material onto the metal-foam current collector electrode, the current collector electrode remains a metal foam comprising pores,
wherein the metal foam is coated with an active nonmetallic material using a sol-gel process to coat at least a portion of the surface and inner pore wall of the metal foam with the active nonmetallic material, and the sol-gel process comprises
preparing a sol-solution that contains precursor compound,
permeating the sol-solution into the inside and onto the metal foam,
drying the metal foam, and
heat-treating the metal foam, and
obtaining an Sn coating with a higher specific capacity than a $SnO_2$ coating, wherein the method of fabricating a metal-foam current collector electrode comprises a porous green-body structure in a furnace in a hydrogen gas atmosphere when an initial coating layer formed on the surface and inner pore wall made of $SnO_2$ from lowering a temperature to freeze the slurry and form ice dendrites, wherein metal powders interposed between the ice dendrites become frozen, sintering transforms the initial coating layer of $SnO_2$ into the Sn coating, and the coating on the active nonmetallic material is the Sn coating.

2. The method of claim 1 wherein a precursor compound, which is utilized for the synthesis of an active nonmetallic material, is selected from a group consisting of the following: $SnCl_4$, $Sn(CH_3COO)_2$, $Sn(NO_3)_2$, $SnCO_3$, $Sn(CH_3)_4$, and $(CH_3)_2SnCl_2$, $Sn(C_4H_9)_2(CHCOO)_2$, and $Sn(XR)_2$ [X=O, S, or N; R=Me, Et, i-PR, or T-Bu].

3. The method of claim 1 wherein a first coating layer is formed onto the metal foam, and when the first coating layer is a metal oxide, then a second coating layer is obtained through an additional reduction process of the first coating under a hydrogen atmosphere, the second coating layer is a metallic coating comprising a metal element of the metal oxide of the first layer, and the coating on the active nonmetallic material is the second coating layer.

4. The method of claim 1 wherein an initial coating layer is a metal oxide and a metallic coating layer is subsequently obtained by a transformation through an additional reduction process of the initial coating under hydrogen atmosphere.

5. The method of claim 1 comprising:
applying a pure Sn coating onto the surface and inner pore wall of the metal foam by using an electroless technique.

6. The method of claim 4 wherein the metallic coating layer comprises a metal element of the metal oxide of the initial coating layer, and the coating on the active nonmetallic material is the metallic coating layer.

7. The method of claim 1 wherein an initial coating layer is a metal oxide, and a metallic coating layer is obtained through an electroless coating process by transforming the metal oxide of the initial coating layer into a metal of a metal element of the metal oxide.

8. The method of claim 5 comprising:
applying anodizing to the Sn coating to form $SnO_2$ needles on the surface of the pure Sn coating.

9. The method of claim 1 wherein the porous copper foam comprises pores constructed three-dimensionally in the copper foam.

10. A method of fabricating a metal-foam current collector electrode for a secondary lithium battery, the method comprising:
coating an active nonmetallic material onto the metal-foam current collector electrode comprising a porous copper foam, wherein at least a portion of a surface and inner pore wall are coated with the active nonmetallic material, and after being coated, the electrode remains a metal foam comprising pores, wherein the coating comprises:
forming a first coating of a metal oxide onto the metal-foam current collector electrode;
transforming the first coating into a second coating of a metal by reducing the first coating in a hydrogen atmosphere, wherein the metal coating comprises a metal element of the metal oxide of the first coating, and the coating on the active nonmetallic material is the second coating; and
obtaining a tin coating with a higher specific capacity than a tin oxide coating, wherein the method of fabricating a metal-foam current collector electrode comprises a porous green-body structure in a furnace in a hydrogen gas atmosphere when an initial coating layer formed on the surface and inner pore wall made of tin oxide from lowering a temperature to freeze the slurry and form ice dendrites, wherein metal powders interposed between the ice dendrites become frozen, sintering transforms the initial coating layer of tin oxide into the tin coating, and the coating on the active nonmetallic material is the tin coating.

11. The method of claim 10 comprising:
anodizing the tin coating to form tin oxide needles on a surface of the tin coating.

12. The method of claim 10 wherein the coating an active nonmetallic material onto the metal-foam current collector electrode comprises:
preparing a sol-solution that contains a precursor compound;
permeating the sol-solution into the inside and onto the metal foam and into pores of the metal foam comprising the coating; and
drying the metal foam; and
heat-treating the metal foam.

13. The method of claim 10 wherein the porous copper foam is coated with the active nonmetallic material comprising a tin oxide using electroless plating.

14. The method of claim 10 wherein the porous copper foam is coated with the active nonmetallic material comprising a tin oxide using impregnation.

15. The method of claim 10 wherein the porous copper foam comprises pores constructed three-dimensionally in the copper foam.

16. The method of claim 10 wherein the metal foam is coated with an active nonmetallic material using at least one of the following methods: ion-plating, sol-gel process, co-precipitation, electroless plating, or impregnation.

17. The method of claim 10 wherein a sol-gel process is used to coat at least a portion of the surface and inner pore wall of the metal foam with the active nonmetallic material.

18. The method of claim 10 wherein a first coating layer is formed onto the metal foam, and when the first coating layer is a metal oxide, then a second coating layer is obtained through an additional reduction process of the first coating under a hydrogen atmosphere, the second coating layer is a metallic coating comprising a metal element of the metal oxide of the first layer, and the coating on the active nonmetallic material is the second coating layer.

19. The method of claim 10 wherein a precursor compound, which is utilized for the synthesis of an active nonmetallic material, is selected from a group consisting of the following: $SnCl_4$, $Sn(CH_3COO)_2$, $Sn(NO_3)_2$, $SnCO_3$, $Sn(CH_3)_4$, and $(CH_3)_2SnCl_2$, $Sn(C_4H_9)_2(CHCOO)_2$, and $Sn(XR)_2$ [X=O, S, or N; R=Me, Et, i-PR, or T-Bu].

* * * * *